UNITED STATES PATENT OFFICE.

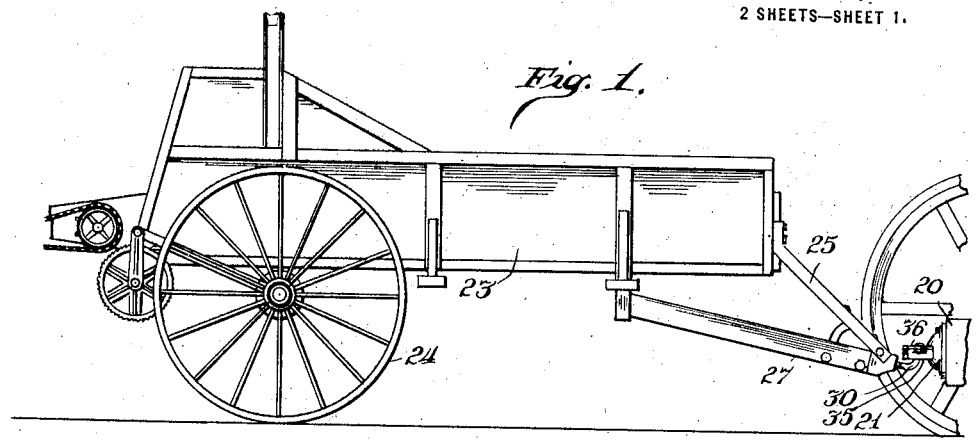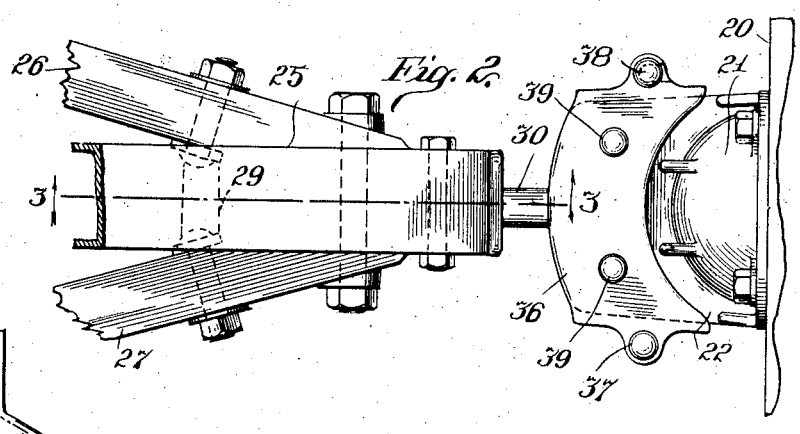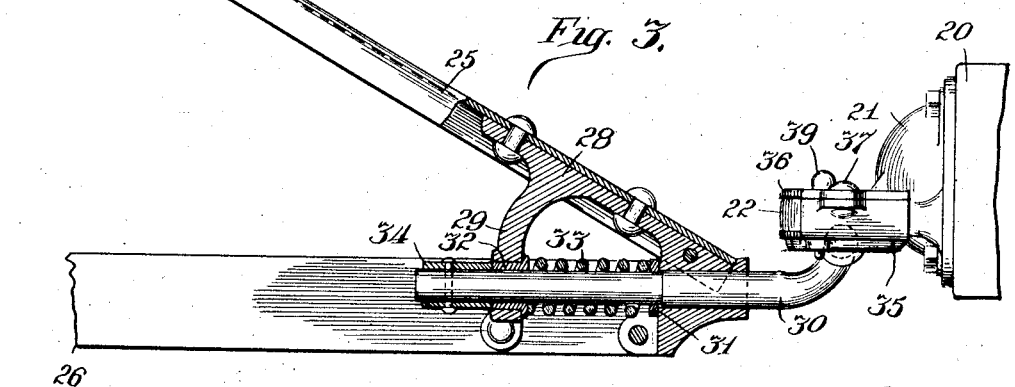

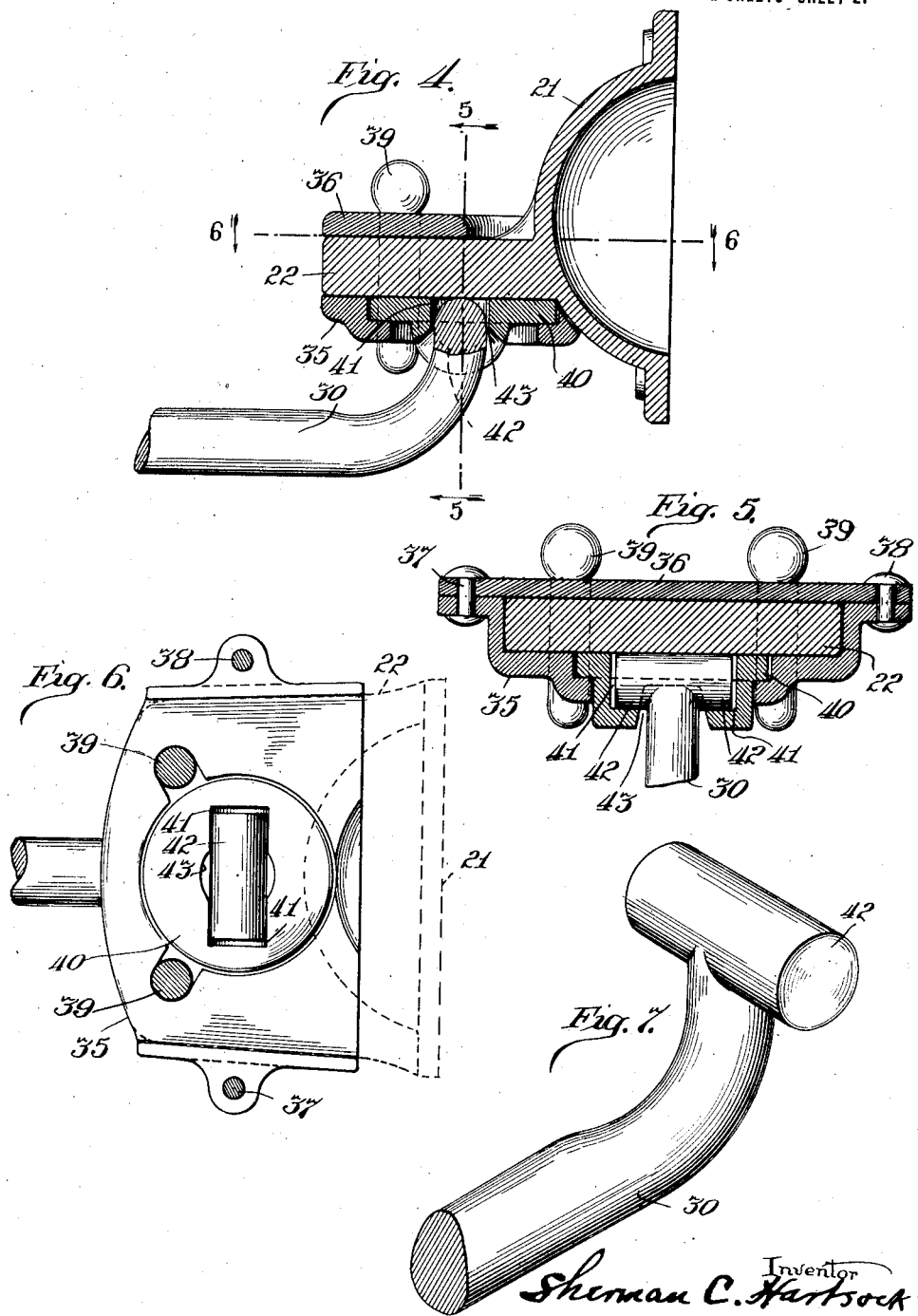

SHERMAN C. HARTSOCK, OF MOLINE, ILLINOIS, ASSIGNOR TO D. M. SECHLER IMPLEMENT & CARRIAGE COMPANY, OF MOLINE, ILLINOIS, A CORPORATION OF ILLINOIS.

COUPLING.

1,357,049.   Specification of Letters Patent.   Patented Oct. 26, 1920.

Application filed April 12, 1920. Serial No. 373,122.

*To all whom it may concern:*

Be it known that I, SHERMAN C. HARTSOCK, a citizen of the United States, and a resident of Moline, in the county of Rock Island and State of Illinois, have invented certain new and useful Improvements in Couplings, of which the following is a specification, reference being had to the accompanying drawings.

My invention relates to couplings of a type adapted for connecting an implement or other vehicle as a trailer behind a tractor, being particularly designed for use with a fertilizer distributer. It is the object of my invention to provide a coupling of this type capable of use with the ordinary draft member at the rear of a tractor, which coupling shall be very strong so as to be capable of withstanding rough use indefinitely and which shall be so flexible as to yield readily as may be required by varying conditions. The preferred means by which I have accomplished my objects are illustrated in the drawings and are hereinafter specifically described. That which I desire to cover by this application is set forth in the claims.

In the drawings,—

Figure 1 is a side view of a fertilizer distributer connected by my improved coupling means to a tractor, parts of the fertilizer distributer being omitted, and only a fragmentary portion of the tractor being shown.

Fig. 2 is a top view of my improved coupling mechanism;

Fig. 3 is a side view of the parts shown in Fig. 2, being partly a section taken on line 3—3 of Fig. 2;

Fig. 4 is a longitudinal vertical section through one member of the coupling mechanism;

Fig. 5 is a transverse vertical section, being taken substantially on line 5—5 of Fig. 4;

Fig. 6 is a horizontal section taken on line 6—6 of Fig. 4, the draft member of the tractor being indicated in dotted lines in order better to illustrate the remaining parts; and Fig. 7 shows in perspective the forward end of the coupling bar of the rear member.

Referring to the several figures of the drawings in which corresponding parts are indicated by the same reference characters, 20 indicates the draw-bar of a tractor of any approved type having a well known form of draft member 21 secured thereon, the draft member 21 comprising a horizontally-disposed plate 22 by which a connection is effected. A trailer in the form of a fertilizer distributer is shown in Fig. 1 connected behind the tractor, the trailer comprising a body 23 of any approved type supported at its rear end by carrying wheels 24. The parts so far described are of any approved construction and form of themselves no part of my present invention.

The body 23 is provided at its forward end with rigidly-mounted draw-bar mechanism comprising a diagonally-disposed bar 25 connected rigidly to the central portion of the front end of the body 23. The bar 25 is preferably in the form of a heavy channel iron so as to have a maximum strength in proportion to its weight. Brace bars 26 and 27 are secured at their rear ends to the sides of the body 23 respectively some little distance in rear of the connection of the bar 25 to the body. As is best shown in Figs. 1 and 2, the brace bars 26 and 27 extend diagonally downwardly and inwardly, being connected together at their forward ends and connected to the forward end of the bar 25 through the medium of a heavy bracket 28, as is best shown in Fig. 3. By the use of three converging arms in the manner illustrated, the bracket 28 is held very rigidly in position with respect to the body 23.

As is best shown in Fig. 3, the bracket 28 comprises an arm 29 extending downwardly from its rear end portion. Revolubly and slidably mounted in the forward end of the bracket 28 and in the lower end of the arm 29 is a coupling bar 30, the arm 29 having a suitable opening in alinement with an opening in the forward end of the bracket for this purpose. The rear end of the coupling bar 30 is of slightly reduced diameter, whereby a collar 31 is provided a seat upon the bar. A bushing 32 is mounted about the bar 30 within the opening through the arm 29, the bushing having a flange at its forward end for preventing the bushing from passing backward through the opening. A heavy coiled spring 33 is mounted upon the bar 30 between the bushing 32 and the collar 31, whereby the coupling bar is held yieldingly against backward movement with respect to the bracket 28. A sleeve 34 is mounted on the rear end of the bar 30 adjacent to the bushing 32, whereby the coupling bar is also held yieldingly against forward movement with respect to the bracket 28.

For connecting the coupling bar 30 to the horizontally-disposed plate 22 of the draft member 21, I have provided a housing which is adapted to embrace the plate 22 and to be removably secured thereto. This housing comprises a body member 35 and a top closure plate 36 which is pivotally connected by means of a pin 37 with the body member (see Fig. 2). Another pin 38 at the opposite side has a slotted connection with the plate 36, the construction being such that the plate 36 can be turned about the pin 37 with respect to the body 35. The housing comprising the plate 36 and the body 35 is adapted to be held in position upon the plate 22 by means of pins 39 passing through suitable registering openings in the plates 36 and 22 and the plate forming the bottom wall of the body member 35.

Connection is effected between the coupling bar 30 and the body member 35 of the housing by means of a circular plate 40 which is revolubly mounted in a circular flanged opening in the bottom of the member 35, as is shown in Figs. 4 and 5. The plate 40 is provided with a transversely-disposed groove or elongated socket 41 which is rounded at its lower portion so as to receive a crosshead 42 provided on the turned-up forward end of the coupling bar 30, the bar 30 extending downwardly through a central opening 43 in the plate 40 as is shown in Figs. 5 and 6. By the use of the plate 40 revolubly mounted upon the body member 35, with the crosshead 42 mounted so as to swing upon an axis at right angles to the axis of the plate 40, and with the coupling bar 30 revolubly mounted in the bracket 28 upon an axis at right angles to the axis of the plate 40 and also at right angles to the axis of the crosshead 42, I have provided a universal joint mechanism which is adapted to yield to meet any varying conditions due to irregularities of the ground over which the tractor and trailer are passing. By the use of the spring 33, the traction is applied to the trailer in a yielding manner either in the forward movement of the tractor or in the backward movement.

My construction provides an effective coupling for the application of power from the draft member to the coupling bar. The crosshead 42 of the coupling bar is held immediately adjacent to the plate 22 and the pins 39 by their two-point bearing on the housing apply the power evenly without any twisting tendency. Side pressure is taken care of not only by the pins 39 but also by the side walls of the housing. By connecting the upper plate of the housing pivotally in position, I am enabled to effect a coupling operation very readily, the housing being raised to its normal operative position with respect to the draft member with the plate 36 displaced laterally, after which the plate 36 is swung into closure position and the retaining pins 39 are inserted in position.

What I claim as my invention, and desire to secure by Letters Patent, is:—

1. A coupling comprising in combination a housing adapted to inclose a draft member on its top, bottom and sides, means for rigidly but removably connecting said housing to said draft member, a coupling bar, and rotatable means carried by said housing with which a head on the forward end of said bar movably engages to permit the bar to swing both laterally and vertically.

2. A coupling comprising in combination a housing adapted to inclose a draft member on its top, bottom and sides, means for rigidly but removably connecting said housing to said draft member, a coupling bar, a rotatable plate supported by the housing, and means at the forward end of the coupling bar for engaging said rotatable plate.

3. A coupling comprising in combination a plate, means for movably securing it against one face of a draft member of a vehicle, a second plate rotatably mounted in a recess in said first-mentioned plate and provided with a transverse groove or socket, and a coupling bar projecting through an opening in said rotatable plate and having a crosshead revolubly mounted in said groove or channel.

4. A coupling comprising a rotatable plate, means for removably securing said plate opposite one face of a horizontally-disposed draft member, a coupling bar, and a transversely-extending crosshead on said bar revolubly mounted in a transverse groove in said plate.

5. A coupling comprising a plate, means for removably securing said plate on one face of a horizontally-disposed draft member, a second plate revolubly mounted on a vertical axis on said first-named plate adjacent to said draft member, a coupling bar, and a transversely-extending crosshead on said bar revolubly mounted in a transversely-extending groove in said second plate.

6. A coupling comprising a plate, means for removably securing said plate on one face of a horizontally-disposed draft member, a coupling bar passing through an opening in said plate and extending backwardly therefrom, and a crosshead on the end of said coupling bar adapted to prevent withdrawal of the coupling bar by a backward pull thereon and serving also as a bearing for said coupling bar in a transversely-disposed groove in said plate.

7. A coupling comprising a plate, means for removably securing said plate on one face of a horizontally-disposed draft member, a second plate revolubly mounted on a vertical axis on said first-named plate adjacent to said draft member, a coupling bar passing through an opening in said second plate and extending backwardly therefrom, and a crosshead on the end of said coupling bar adapted to prevent withdrawal of the coupling bar by a backward pull thereon and serving also as a bearing for said coupling bar in a transversely-disposed groove in said second plate.

8. A coupling comprising a plate, means for removably securing said plate on the lower face of a horizontally-disposed draft member, a second plate circular in shape revolubly mounted in a flanged circular opening in said first-named plate, a coupling bar passing through openings in said plates and extending backwardly therefrom, and a crosshead on the end of said coupling bar adapted to prevent withdrawal of the coupling bar by a backward pull thereon and serving also as a bearing for said coupling bar in a transversely-disposed groove in said second plate.

9. A coupling comprising a housing adapted to inclose a draft member, pins passing through openings in said draft member and in the top and bottom plates of said housing for removably securing said housing upon said draft member, a third plate revolubly mounted on a vertical axis between the bottom plate of the housing and said draft member, a coupling bar passing through an opening in said third plate and extending backwardly therefrom, and a crosshead on the end of said coupling bar adapted to prevent withdrawal of the coupling bar by a backward pull thereon and serving also as a bearing for said coupling bar in a transversely-disposed groove in said second plate.

10. In a coupling, the combination of a housing adapted to inclose a horizontally-disposed draft member, said housing comprising a body portion, a top closure plate pivotally mounted on the body portion and adapted to be displaced laterally for receiving the draft member in operative position from above, and means for securing said closure plate to said body portion, a second plate revolubly mounted in the body portion of said housing below said draft member, a coupling bar passing through an opening in said second plate and extending backwardly therefrom, and a crosshead on the end of said coupling bar adapted to prevent withdrawal of the coupling bar by a backward pull thereon and serving also as a bearing for said coupling bar in a transversely-disposed groove in said second plate.

11. A coupling for attaching a trailer to a tractor, comprising a bracket, means for holding said bracket firmly in fixed position with respect to the body of the trailer, a coupling bar extending forwardly from said bracket and revoluble about a longitudinal axis with respect thereto, a transversely-disposed crosshead on the front end of said coupling bar, a plate through an opening in which said coupling bar passes and in a transversely-disposed groove in which said crosshead is revolubly mounted, and means for removably securing said plate to the draft member of a tractor.

SHERMAN C. HARTSOCK.